United States Patent
Oya et al.

(10) Patent No.: US 10,020,092 B2
(45) Date of Patent: Jul. 10, 2018

(54) INSULATED WIRE AND METHOD OF PRODUCING THE SAME

(71) Applicants: FURUKAWA ELECTRIC CO., LTD., Tokyo (JP); FURUKAWA MAGNET WIRE CO., LTD., Tokyo (JP)

(72) Inventors: Makoto Oya, Tokyo (JP); Ryousuke Obika, Tokyo (JP); Keiichi Tomizawa, Tokyo (JP)

(73) Assignees: FURUKAWA ELECTRIC CO., LTD., Tokyo (JP); FURUKAWA MAGNET WIRE CO., LTD., Tokyo (JP)

(*) Notice: Subject to any disclaimer, the term of this patent is extended or adjusted under 35 U.S.C. 154(b) by 0 days.

(21) Appl. No.: 15/368,235

(22) Filed: Dec. 2, 2016

(65) Prior Publication Data
US 2017/0084361 A1  Mar. 23, 2017

Related U.S. Application Data

(63) Continuation of application No. PCT/JP2015/066016, filed on Jun. 3, 2015.

(30) Foreign Application Priority Data

Jun. 3, 2014 (JP) ................................. 2014-114954

(51) Int. Cl.
*H01B 3/30* (2006.01)
*H01B 3/42* (2006.01)
(Continued)

(52) U.S. Cl.
CPC ............. *H01B 3/308* (2013.01); *H01B 1/023* (2013.01); *H01B 3/30* (2013.01); *H01B 3/306* (2013.01);
(Continued)

(58) Field of Classification Search
CPC . H01B 3/30; H01B 3/42; H01B 13/14; H01B 1/02; H01B 3/308; H01B 1/023; H01B 3/306; H01B 3/427; H01B 13/148
(Continued)

(56) References Cited

U.S. PATENT DOCUMENTS 3,984,619 A * 10/1976 Raw ..................... C22C 21/00
148/698
4,495,321 A * 1/1985 Arnold ................. H01B 3/306
524/104

(Continued)

FOREIGN PATENT DOCUMENTS

CN 102812524 A 12/2012
CN 103177807 A 6/2013
(Continued)

OTHER PUBLICATIONS

International Search Report for PCT/JP2015/066016 (PCT/ISA/210) dated Sep. 1, 2015.
(Continued)

*Primary Examiner* — Michael F McAllister
(74) *Attorney, Agent, or Firm* — Birch, Stewart, Kolasch & Birch, LLP

(57) ABSTRACT

An insulated wire which comprises an aluminum conductor, having: an adhesion layer formed by directly baking, on the aluminum conductor, varnish containing a carboxy group; an insulation layer as an outer layer of the adhesion layer; and a reinforcement insulation layer as an outer layer of the insulation layer; and a method of producing the same.

10 Claims, 2 Drawing Sheets

(51) Int. Cl.
  *H01B 7/00* (2006.01)
  *H01B 7/02* (2006.01)
  *H01B 13/00* (2006.01)
  *H02K 3/30* (2006.01)
  *H01B 1/02* (2006.01)
  *H01B 13/14* (2006.01)

(52) U.S. Cl.
  CPC .............. *H01B 3/42* (2013.01); *H01B 3/427* (2013.01); *H01B 7/00* (2013.01); *H01B 7/02* (2013.01); *H01B 13/00* (2013.01); *H01B 13/148* (2013.01); *H02K 3/30* (2013.01)

(58) Field of Classification Search
  USPC ...................................................... 174/119 R
  See application file for complete search history.

(56) References Cited

U.S. PATENT DOCUMENTS

| | | | | |
|---|---|---|---|---|
| 4,581,293 | A * | 4/1986 | Saunders | C08G 59/12 427/185 |
| 4,935,302 | A * | 6/1990 | Hjortsberg | C08K 3/22 174/110 N |
| 4,968,780 | A * | 11/1990 | Fenoglio | C08G 69/32 528/350 |
| 6,288,342 | B1 | 9/2001 | Ueoka et al. | |
| 8,741,441 | B2 * | 6/2014 | Honda | C09D 179/08 174/137 A |
| 9,330,814 | B2 * | 5/2016 | Hisada | H01B 7/0225 |
| 2006/0194051 | A1 * | 8/2006 | Fukuda | H01B 3/301 428/375 |
| 2009/0202831 | A1 * | 8/2009 | Honda | C08G 73/1042 428/383 |
| 2011/0048766 | A1 * | 3/2011 | Kikuchi | C08G 73/1035 174/110 SR |
| 2011/0192632 | A1 | 8/2011 | Abe et al. | |
| 2012/0285724 | A1 * | 11/2012 | Oya | H01B 3/306 174/120 C |
| 2013/0014971 | A1 | 1/2013 | Muto et al. | |
| 2013/0037304 | A1 | 2/2013 | Ikeda et al. | |
| 2013/0161065 | A1 | 6/2013 | Honda et al. | |
| 2014/0020929 | A1 * | 1/2014 | Hisada | H01B 7/0225 174/110 SR |
| 2014/0065421 | A1 | 3/2014 | Ushiwata et al. | |
| 2015/0027748 | A1 | 1/2015 | Fukuda et al. | |
| 2015/0221412 | A1 * | 8/2015 | Caudill | H01B 3/427 428/339 |

FOREIGN PATENT DOCUMENTS

| | | |
|---|---|---|
| CN | 103680697 A | 3/2014 |
| JP | 63-195913 A | 8/1988 |
| JP | 7-31944 A | 2/1995 |
| JP | 2000-235818 A | 8/2000 |
| JP | 2007-287399 A | 11/2007 |
| JP | 2011-165485 A | 8/2011 |
| JP | 2013-41700 A | 2/2013 |
| JP | 5391324 B1 | 1/2014 |

OTHER PUBLICATIONS

Written Opinion of the International Searching Authority for PCT/JP2015/066016 (PCT/ISA/237) dated Sep. 1, 2015.
Chinese Office Action and Search Report for Chinese Application No. 201580029480.7, dated Sep. 14, 2017, with English translations.
Extended European Search Report dated Jan. 2, 2018 for corresponding European Application No. 15802967.8.

* cited by examiner

INSULATED WIRE AND METHOD OF PRODUCING THE SAME

CROSS-REFERENCE TO RELATED APPLICATIONS

This application is a Continuation of PCT International Application No. PCT/JP2015/066016 filed on Jun. 3, 2015, which claims priority under 35 U.S.C. § 119 (a) to Japanese Patent Application No. 2014-114954 filed in Japan on Jun. 3, 2014. Each of the above applications is hereby expressly incorporated by reference, in its entirety, into the present application.

TECHNICAL FIELD

The present invention relates to an insulated wire and to a method of producing the same.

BACKGROUND ART

Inverters have become installed in many types of electrical equipments, as efficient variable-speed control units. Inverters are switched at a frequency of several of kHz to several tens of kHz, to cause a surge voltage at every pulse thereof. Inverter surge is a phenomenon in which reflection occurs at a breakpoint of impedance, for example, at a starting end, a termination end, or the like of a connected wire in the propagation system, and consequently, to apply a voltage twice as high as the inverter output voltage at the maximum. In particular, an output pulse occurred due to a high-speed switching device, such as an IGBT (insulated gate bipolar transistor), is high in steep voltage rise. Accordingly, even if a connection cable is short, the surge voltage is high, and voltage decay due to the connection cable is also low. As a result, a voltage almost twice as high as the inverter output voltage occurs.

As coils for electrical equipments, such as inverter-related equipments, for example, high-speed switching devices, inverter motors, and transformers, use is made of insulated wires, which are mainly enameled wires, as magnet wires in the coils. Further, as described above, since a voltage almost twice as high as the inverter output voltage is applied to the in inverter-related equipments. Thus, it has become required to minimize the inverter surge deterioration of the enameled wire, which is one of the materials constituting the coils of those electrical equipments.

In general, partial discharge deterioration is a phenomenon in which an electrical-insulation material undergoes, in a complicated manner, for example, molecular chain breakage deterioration caused by collision with charged particles that have been generated by partial discharge of the insulating material, sputtering deterioration, thermal fusion or thermal decomposition deterioration caused by local temperature rise, and chemical deterioration caused by ozone generated due to discharge. For any of those, reduction in thickness of the electrical-insulation materials may be observed, which have been deteriorated as a result of the partial discharge.

It is believed that inverter surge deterioration of an insulated wire also proceeds by the same mechanism as in the case of general partial discharge deterioration. That is, inverter surge deterioration of an enameled layer is a phenomenon in which partial discharge occurs in the insulated wire due to the surge voltage with a high peak value, which is occurred at the inverter, and the coating of the insulated wire causes partial discharge deterioration as a result of the partial discharge, resulting in that the inverter surge deterioration of an enameled layer of the coating of the insulated wire is high-frequency partial discharge deterioration.

Such a deterioration of the enameled layer of the insulated wire can be prevented by the insulated wire having a high partial discharge inception voltage, and a method of using a resin having low relative permittivity in the enameled layer, and/or a method of increasing a thickness of the enameled layer, are considered.

However, in the former method, if other characteristics (heat resistance, solvent resistance, flexibility, and the like) required for the enameled layer are taken into consideration, it is difficult to select the resin having a particularly low in relative permittivity.

Moreover, in order to satisfy electrical properties, such as dielectric breakdown voltage and partial discharge inception voltage in the latter method, 60 µm or more is empirically required as the thickness of the enameled layer.

However, if a wire is passed through a high-temperature baking furnace a plurality of times in a production process in order to increase a thickness of an enameled layer composed of a thermosetting resin, a copper oxide coating grows on a surface of copper being a conductor, and adhesion force between the conductor and the enameled layer is lowered. As a result, there has existed a problem in which workability, such as flexibility, is significantly lowered.

Moreover, if the thickness to be applied in one-time baking is increased in order to reduce the number of times passing through the baking furnace, there has existed a disadvantage in which a solvent in varnish is not wholly evaporated and remains as gas bubbles in the enameled layer.

On the other hand, weight reduction is required for a motor, and development has been advanced on significant weight reduction of the coils by using an aluminum conductor. Not only the weight can be reduced by use of aluminum, but also ease of bending, namely flexibility being important for a winding wire for coils can also be improved.

Moreover, a passive state is formed on a surface of the aluminum conductor. Thus, lowering in the adhesion force between the conductor and the enameled layer as caused by growth of oxide coating, which has become the problem in the cupper conductor, can be prevented, and damage on an electrical wire coating in a coil working step, and lowering in electrical insulation performance can be prevented. In particular, the insulated wire having high mechanical strength, such as abrasion resistance, can be produced.

Where, it is understood that tensile stress applied to the conductor is increased by increasing the number of times of baking in baking of the enameled wire. Moreover, it is also known that physical strength of the conductor is significantly lowered by increase of a received heat quantity when aluminum is used for the conductor. Owing to these two phenomena, there has existed a problem in which reliability as the winding wire is reduced, such as lowering in accuracy of a conductor diameter or rupture strength (breaking strength) of the conductor by increasing the number of times of baking, in the case of the aluminum conductor enameled wire.

Hitherto, attempts have been made on improving characteristics, such as high heat resistance and high abrasion resistance, by a newly provided covering resin layer, in addition to enhance the partial discharge inception voltage by providing a covering resin outside the enameled wire. Proposals have been made on providing an extrusion covering layer on an enameled layer in, for example, Patent Literatures 1, 2, and the like. On the other hand, it is understood that, when extrusion covering is performed on the enameled wire of the Al conductor, adhesion force between the aluminum conductor and the enameled layer is readily lowered because a temperature of an extruded resin is high. However, no studies have been made on the adhesion force between the conductor and the enameled layer in the arts proposed in Patent Literatures 1 and 2. When coil winding on the motor or the transformer is performed in a state in which the adhesion force between the conductor and the enameled layer is low, damage is readily caused on the electrical wire coating in the coil working step, to cause a problem in which the electrical insulation performance is lowered and the reliability of a product is lowered.

It has become demanded to further improve various performances, such as heat resistance, mechanical properties, chemical properties, electrical properties, and reliability, in the electrical equipments developed in recent years, as compared to the conventional electrical equipments. Under the situations, excellent abrasion resistance, thermal aging resistance, and solvent resistance have become required for insulated wires, such as enameled wires, that are used as magnet wires for electrical equipments for aerospace use, electrical equipments for aircraft, electrical equipments for nuclear power, electrical equipments for energy, and electrical equipments for automobiles. For example, in recent electrical equipments, a capability of maintaining excellent thermal aging resistance for a further longer period of time is required in several cases.

Further, electrical equipments, which are represented by motors or transformers, have recently advanced in size reduction and performance improvement, and it becomes found that, in many applications, insulated wires to be used are pushed into a quite narrow space to pack. Specifically, it is not an exaggeration to say that the performance of a rotary electric machine, such as a motor, depends on how many electrical wires can be placed and packed in a stator slot.

As a result, as a means for increasing the ratio of the cross-sectional area of the conductor to the cross-sectional area of the stator slot (hereinafter, referred to a stacking factor or a space factor), it has been lately attempted to use a rectangular wire in which the conductor has a shape similar to a quadrilateral (square or rectangle). Use of a rectangular wire exhibits a dramatic effect in increasing the stacking factor. However, there are known that it is difficult to uniformly apply an insulation coating on a rectangular conductor, and that it is particularly difficult to control the thickness of the insulation coating in an insulated wire having a small cross-sectional area.

CITATION LIST

Patent Literatures

Patent Literature 1: JP-B-1995(H07)-031944 ("JP-B" means examined Japanese patent publication)
Patent Literature 2: JP-A-1988(S63)-195913 ("JP-A" means unexamined published Japanese patent application)

SUMMARY OF INVENTION

Technical Problem

The present invention is contemplated for providing an insulated wire formed of an adhesion layer prepared by baking a thermosetting resin on an aluminum conductor or an alloy conductor containing aluminum, and a plurality of insulation layers, in which the insulated wire is excellent in both of abrasion resistance and thermal aging resistance by improving adhesion force between the conductor and an enameled layer, and further excellent in suppressing lowering in rupture strength of the conductor, and high in partial discharge inception voltage; and for providing a method of producing the same.

Solution to Problem

The inventors of the present invention diligently continued to conduct study, in order to solve the problems of the above-described existing technologies, by baking an adhesion layer using a suitable coating material, and then performing extrusion covering or tape winding of a thermoplastic resin. As a result, the inventors of the present invention have found that an insulated wire has high heat resistance and electrical properties by providing an adhesion layer by directly baking, on a conductor containing aluminum, varnish containing a carboxy group, and providing an insulation layer by covering, on an outside thereof, a thermoplastic resin having a melting point of 180° C. or higher in the case of a crystalline resin, or a thermoplastic or thermosetting resin having a glass transition temperature of 180° C. or higher in the case of an amorphous resin. The inventors, further, have found that high partial discharge inception voltage can be obtained by providing a reinforcement insulation layer as an outer layer, without increasing a thickness of the adhesion layer. It is unnecessary to increase the thickness of the adhesion layer, and therefore it is unnecessary to increase the number of times of baking, namely, a heat quantity to be applied to the conductor is significantly reduced. Thus, lowering in rupture strength of the conductor can be prevented, and excellent thermal aging resistance can be maintained over a long period of time. The present invention has been completed based on those findings.

That is, the present invention provides the following means:

(1) An insulated wire which comprises an aluminum conductor, having:
an adhesion layer formed by baking, on the aluminum conductor, varnish containing a carboxy group;
an insulation layer as an outer layer of the adhesion layer; and
a reinforcement insulation layer as an outer layer of the insulation layer.

(2) The insulated wire described in the above item (1), wherein a total thickness of the adhesion layer and the insulation layer is 20 µm or more and 85 µm or less.

(3) The insulated wire described in the above item (1) or (2), wherein a resin with which the insulation layer is formed is a crystalline resin having a melting point of 180° C. or higher or an amorphous resin having a glass transition temperature of 180° C. or higher.

(4) The insulated wire described in any one of the above items (1) to (3), wherein the varnish contains polyamic acid.

(5) The insulated wire described in any one of the above items (1) to (4), wherein the reinforcement insulation layer is composed of a thermoplastic resin.

(6) The insulated wire described in any one of the above items (1) to (5), wherein purity of aluminum in the aluminum conductor is 95% or more.

(7) The insulated wire described in any one of the above items (1) to (6), wherein a resin with which the insulation layer is composed is composed of a thermosetting resin having a glass transition temperature of 180° C. or higher, and wherein a resin over 50 mass % of the resin with which the insulation layer is composed is polyamideimide or/and polyimide.

(8) The insulated wire described in any one of the above items (1) to (7), wherein a resin with which the insulation layer is composed is composed of a thermosetting resin having a glass transition temperature of 180° C. or higher, and wherein a resin over 50 mass % of the resin with which the insulation layer is composed is a mixed resin of polyamideimide and polyimide.

(9) The insulated wire described in any one of the above items (1) to (8), wherein the reinforcement insulation layer is composed of a thermoplastic resin containing at least one selected from polyether ether ketone, thermoplastic polyimide, and polyphenylene sulfide, and is formed by performing extrusion of the thermoplastic resin.

(10) The insulated wire described in any one of the above items (1) to (9), wherein a cross-sectional shape of the aluminum conductor is rectangular.

(11) A method of producing an insulated wire which comprises an aluminum conductor, wherein the insulated wire is produced by:

forming an adhesion layer by baking, on the aluminum conductor, varnish containing a carboxy group;

providing an insulation layer as an outer layer of the adhesion layer; and then forming a reinforcement insulation layer as an outer layer of the insulation layer by performing extrusion of a thermoplastic resin.

In this specification, the numerical range expressed by using the expression "to" means a range including numerical values before and after the expression "to" as the lower limit and the upper limit.

Other and further features and advantages of the invention will appear more fully from the following description, appropriately referring to the accompanying drawings.

Advantageous Effects of Invention

An aluminum conductor insulated wire of the present invention has features of being excellent in adhesion force between a conductor and an adhesion layer, and between the adhesion layer and an insulation layer, and excellent in both of abrasion resistance and thermal aging resistance, and further excellent in suppressing lowering in rupture strength of the conductor, and high in partial discharge inception voltage.

MODE FOR CARRYING OUT THE INVENTION

Figure 1:
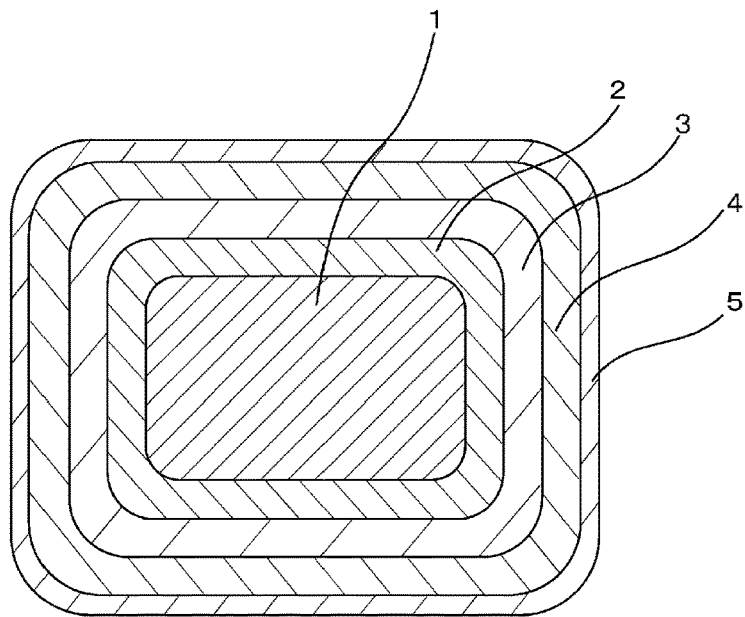
FIG. 1 is a schematic cross-sectional view of an insulated wire of the present invention, in which a conductor cross section is rectangular.
Figure 2:
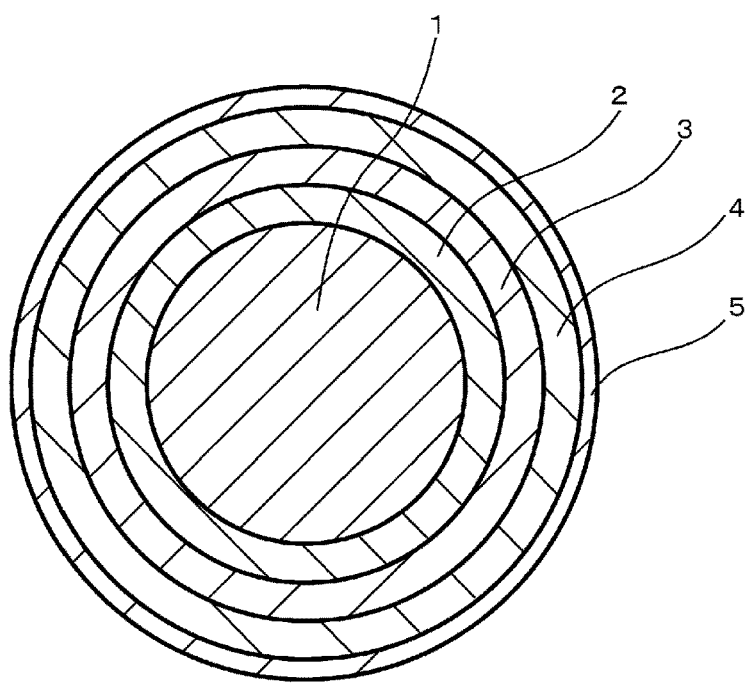
FIG. 2 is a schematic cross-sectional view of an insulated wire of the present invention, in which a conductor cross section is circular.

According to the present invention, for example, as shown in FIG. 1 and FIG. 2, an insulated wire has, on an outer periphery of an aluminum conductor 1 (hereinafter, also referred to simply as "Al conductor"), at least one layer of an adhesion layer 2, at least one layer of an insulation layer 3, and at least one layer of a reinforcement insulation layer 4 as an outside thereof.

In the present invention, a total thickness of the adhesion layer 2, the insulation layer 3 and the reinforcement insulation layer 4 is preferably 50 μm or more, a total thickness of the adhesion layer 2 and the insulation layer 3 is preferably 85 μm or less, and a thickness of the reinforcement insulation layer 4 is preferably 200 μm or less. Moreover, a melting point or a glass transition temperature of a resin with which the insulation layer 3 is composed is preferably 180° C. or higher.

In addition, in FIG. 1 and FIG. 2, an outermost layer 5 is further provided outside the reinforcement insulation layer 4, but provision of the outermost layer 5 is not essential, and the reinforcement insulation layer 4 may serve as the outermost layer 5.

The insulated wire of the present invention is high in adhesion force between the Al conductor and the adhesion layer, and partial discharge inception voltage, and further excellent in suppressing lowering in rupture strength of the conductor, and can maintain excellent thermal aging resistance over a long period of time.

Thus, the insulated wire of the present invention is preferable as heat-resistant winding use, and can be used, for example, in coils of electrical equipments, such as inverter-related equipments, high-speed switching devices, inverter motors, and transformers, and magnet wires for electrical equipments for aerospace use, electrical equipments for aircraft, electrical equipments for nuclear power, electrical equipments for energy, and electrical equipments for automobiles. In particular, the insulated wire can be preferably applied as an inverter surge-resistant insulated wire.

One preferable embodiment of the present invention is, for example, as shown in FIG. 1, an insulated wire in which a conductor 1 has a rectangular cross section, each side of facing first two sides and facing second two sides in the cross section has an adhesion layer 2, an insulation layer 3, and a reinforcement insulation layer 4, and a total thickness of the adhesion layer 2, the insulation layer 3, and the reinforcement insulation layer 4 each has a specific value in each side of at least the facing first two sides among these sides.

That is, one preferable embodiment of the present invention is the insulated wire having, on an outer periphery of the conductor 1 having the rectangular cross section, at least one layer of the adhesion layer 2, at least one layer of the insulation layer 3, and at least one layer of the reinforcement insulation layer 4 as an outside thereof, in which, in the cross section, in each side of the facing first two sides in the cross section, a total thickness of the adhesion layer 2, the insulation layer 3, and the reinforcement insulation layer 4 is 50 μm or more, a total thickness of the adhesion layer 2 and the insulation layer 3 is 85 μm or less, and the thickness of the reinforcement insulation layer 4 is 200 μm or less.

The total thickness of the adhesion layer, the insulation layer, and the reinforcement insulation layer is more preferably 50 μm to 250 μm, further preferably 80 μm to 230 μm, and particularly preferably 100 μm to 200 μm.

The partial discharge inception voltage and abrasion resistance characteristics can be particularly improved by adjusting the total thickness of the adhesion layer, the insulation layer, and the reinforcement insulation layer to 50 μm or more. A conductor stacking factor in a stator slot can be improved, while high partial discharge inception voltage is maintained, by adjusting the total thickness of the adhesion layer, the insulation layer, and the reinforcement insulation layer to 250 μm or less.

A total thickness of the adhesion layer and the insulation layer is preferably 20 μm to 85 μm, more preferably 30 μm to 60 μm, and particularly preferably 35 μm to 50 μm.

A received heat quantity of the conductor can be further suppressed upon by providing the insulation layer, and preferable rupture strength can be obtained, by adjusting the total thickness of the adhesion layer and the insulation layer to 85 μm or less. Moreover, occurrence of poor appearance by heat in wind-working, such as welding, can be further suppressed, by adjusting the total thickness of the adhesion layer and the insulation layer to 20 μm or more.

The thickness of the reinforcement insulation layer is preferably 30 μm to 200 μm, more preferably 50 μm to 180 μm, and particularly preferably 70 μm to 150 μm.

This total thickness may be identical to or different from each other in each side, and from a viewpoint of the stacking factor into the stator slot, is preferably different from each other as described below.

That is, partial discharge occurs within the stator slot of the motor or the like has two kinds of a case of occurrence between the slot and the electric wire and a case of occurrence between the electric wires. Then, a proportion (stacking factor) of a total cross section of the conductor to a total cross section within the stator core of the motor can be improved, while a value of partial discharge inception voltage is maintained, by using an insulated wire having a different thickness between a thickness of the reinforcement insulation layer provided on a flat face 8 of the insulation layer and a thickness of the reinforcement insulation layer provided on an edge face 9 of the insulation layer in a cross-sectional shape of the insulated wire.

Figure 3:
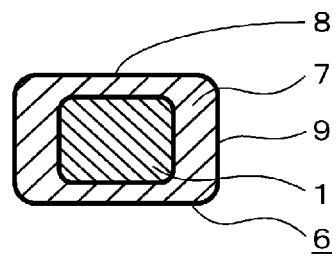
FIG. 3 is a schematic cross-sectional view of an insulated wire in which a conductor cross section is rectangular, and in which a film thickness of a flat face and a film thickness of an edge face are different.

In addition, as shown in FIG. 3, the flat face 8 represents a pair of long sides in facing two sides in a rectangular conductor 1 in a rectangular wire, and the edge face 9 represents a pair of short sides in facing two sides in the rectangular conductor 1 in the rectangular wire. Moreover, the layers, such as the adhesion layer, the insulation layer, the reinforcement insulation layer, and the outermost layer, are collectively expressed as a covering layer 7.

Figure 4:
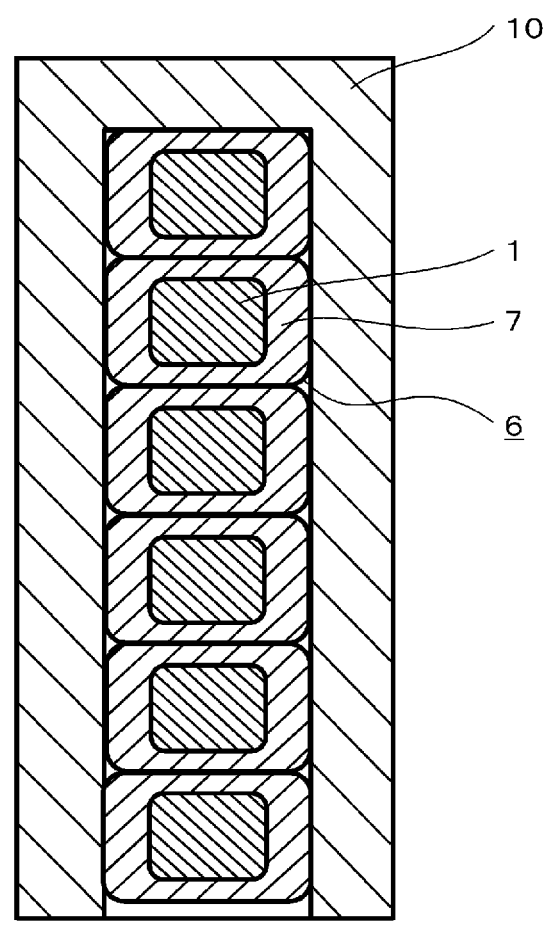
FIG. 4 is a schematic cross-sectional view showing a housing state of a plurality of insulated wires housed in a stator slot.

When electric discharge occurs between a slot 10 and an electric wire (insulated wire 6), upon arranging electric wires (insulated wires 6) each having a different thickness between the edge face 9 and the flat face 8 in one row within the slot 10, as shown in FIG. 4, the electrical wires are arranged in such a manner that a thick film face is brought into contact with the slot 10, and a thin film face is placed between adjacent electric wires (insulated wires 6). A larger number of electric wires can be inserted thereinto by thinness of the film thickness, and therefore the stacking factor can be improved, and the value of partial discharge inception voltage can be maintained. In a similar manner, when the electric discharge readily occurs between the electric wire (insulated wire 6) and the electric wire (insulated wire), if the thick film face is arranged as a face in contact with the electric wire (insulated wire 6), and a thin film face is arranged as a face facing with the slot 10, a size of the slot 10 is not increased beyond necessity, and therefore the stacking factor can be improved, and the value of partial discharge inception voltage can be maintained.

In this preferable embodiment, if the total thickness of the adhesion layer, the insulation layer, and the reinforcement insulation layer each has a predetermined level for both in each side formed in the first two sides between which the electric discharge occurs, even if the total thickness thereof formed in the second two sides is smaller than the thickness described above, the partial discharge inception voltage can be maintained, and the proportion (stacking factor) of the total cross section of the conductor to the total cross section within the stator slot of the motor can be increased. Accordingly, with regard to the total thickness of the adhesion layer, the insulation layer, and the reinforcement insulation layer, in each side provided in the first two sides and the second two sides, the total thickness of the adhesion layer, the insulation layer, and the reinforcement insulation layer in each side of the first two sides between which the electric discharge occurs, namely for both in each side of at least the facing first two sides, only needs to be 50 μm or more, and preferably is 50 μm or more in both of the first two sides and the second two sides, namely four sides.

In the case where the thickness of the reinforcement insulation layer is different between a pair of facing first two sides and a pair of facing second two sides in the cross section, when a thickness of the pair of facing first two sides is taken as 1, a thickness of the pair of facing second two sides is preferably adjusted to the range of 1.01 to 5, and more preferably adjusted to the range of 1.01 to 3.

(Conductor)

As the conductor in the insulated wire of the present invention, aluminum (hereinafter, also referred to simply as "Al") which is used in the insulated wire can be widely used, and the conductor is a high-purity aluminum conductor in which purity (content) of Al is preferably 95% or more, more preferably 98% or more, and further preferably 99% or more. If the aluminum content is 95% or more, deterioration by thermal aging can be suppressed. Moreover, if a content of oxygen component is low, probability of causing poor appearance when the wires are welded can be significantly reduced.

A transverse cross-sectional shape of the conductor may be any shapes, such as a circular shape (round), a rectangular shape (rectangular) or a hexagonal shape, may be utilized. However, in view of the stacking factor to the stator slot, a conductor having a shape other than a circular shape is preferable, and a rectangular conductor is particularly preferable.

A size of the conductor is not particularly designated. In the case of a round conductor, the size is preferably 0.3 to 3.0 mm, and preferably 0.4 to 2.7 mm in terms of a diameter.

With regard to the conductor having the rectangular shape, in view of suppressing the partial discharge from corners, a conductor having a shape in which chamfering (curvature radius r) is provided in four corners, as shown in FIGS. 1 and 3 is desirable. The curvature radius r is preferably 0.6 mm or less, and more preferably 0.2 to 0.4 mm.

In the case of a rectangular conductor, a size of the conductor is not particularly designated. A width (long side) is preferably 1.0 to 5.0 mm, and more preferably 1.4 to 4.0 mm, and a thickness (short side) is preferably 0.4 to 3.0 mm, and more preferably 0.5 to 2.5 mm. A ratio of length of thickness (short side) to width (long side) is preferably 1:1 to 1:4.

(Adhesion Layer)

In the present invention, the adhesion layer means a thermosetting resin layer in contact with the conductor, and unless a component in further contact therewith is changed, the adhesion layer is regarded as one layer. That is, the adhesion layer may be one layer or a plurality of layers, as long as the adhesion layer is formed into at least one layer with the thermosetting resin, and the thermosetting resin is directly applied onto the conductor. In addition, when varnish containing the thermosetting resin is directly applied onto the conductor, and baked, and application and baking are repeated a plurality of times in order to increase the thickness by using the same varnish, the resultant layer is regarded as one layer.

In the present invention, a thickness of the adhesion layer is preferably less than 20 µm in consideration of physical strength of the coating as a whole. On the other hand, from a viewpoint of the stacking factor to the stator slot, an upper limit of the thickness is preferably 15 µm or less, more preferably 10 µm or less, and particularly preferably 5 µm or less.

A lower limit of thickness of the adhesion layer is preferably 1 µm or more, and more preferably 3 µm or more.

In the present invention, the adhesion layer is formed by directly applying varnish containing a carboxy group onto the conductor, and baking the resultant material. At least in the varnish, the carboxy group exists, in a varnish state, in the resin to be incorporated thereinto.

In the present invention, adhesion force with the aluminum conductor can be sufficiently enhanced by using such a varnish without depending on conditions after being baked, which is resulted from strongly forming a bonding of the carboxy group existing in a proper amount with aluminum by ionic bonding or complex bonding.

Herein, the resin having the carboxy group is a material having the carboxy group in a polymer main chain or a side chain directly or through a linking group, or a material having the carboxy group at a terminal of the polymer main chain or the side chain. This carboxy group may be inorganic or organic salt thereof, or may be protected with a sealing material, such as metal and alcohol.

An acid value (KOH mg/g, KOH required for neutralizing free acid) in 1 g of the resin having the carboxy group is preferably 10 to 250 mg/g, more preferably 50 to 230 mg/g, and further preferably 80 to 220 mg/g.

Examples of the resin having the carboxy group include: polyimide (PI), polyamideimide, polyester, polyesterimide, polyetherimide, and a coating material of polyamic acid, and may be a material that reacts therewith by baking.

As the thermosetting resin with which the adhesion layer is formed, a material that has been used so far can be used. Specific examples thereof include: polyimide (PI), polyamideimide (PAI), polyesterimide (PEsI), polyetherimide (PEI), polyimide hydantoin modified polyester, polyamide (PA), formal, polyurethane, polyester (PEst), polyvinylformal, epoxy, and polyhydantoin. In view of excellent heat resistance, a polyimide-based resin, such as polyimide (PI), polyamideimide (PAI), polyesterimide (PEsI), polyetherimide (PEI), and polyimide hydantoin-modified polyester, is preferable. One kind of these materials may be used alone, or two or more kinds may be mixed and used, as the enameled resin.

Polyamideimide (PAI) is not particularly limited, and a material obtained by an ordinary method, and use can be made, for example, of: a material obtained by allowing tricarboxylic anhydride to directly react with diisocyanate in a polar solvent; a material obtained by mixing tricarboxylic anhydride with diamine in a polar solvent, to form amide with diisocyanate, or the like. As commercially available polyamideimide, HI-406 (trade name, manufactured by Hitachi Chemical Company, Ltd.) can also be used.

Polyimide (PI) is not particularly limited, and use can be made, for example, of: an ordinary polyimide resin, such as thermosetting aromatic polyimide; a material prepared by using a polyamide acid (polyamic acid) solution obtained by allowing aromatic tetracarboxylic dianhydride to react with aromatic diamine in a polar solvent, to form polyimide by heat treatment in baking upon forming an insulated coating, to cause thermosetting, or the like. As commercially available polyimide, U Imide (registered trademark) (manufactured by Unitika Ltd.), U-Varnish (trade name, manufactured by Ube Industries, Ltd.), HCI series (trade names, manufactured by Hitachi Chemical Company Ltd.), AURUM (registered trademark) (manufactured by Mitsui Chemicals, Inc.) or the like can also be used.

Polyester (PEst) is not particularly limited, and use can be made of: a modified material by adding a phenolic resin or the like to aromatic polyester or the like. Specific examples thereof include: a polyester resin a heat resistance class of which is H class. As commercially available H-class polyester resin, Isonel 200 (trade name, manufactured by Schenectady International, Inc.) or the like can be used.

Polyesterimide (PEsl) is not particularly limited, and use can be made of: a material obtained by an ordinary method, for example, by allowing tricarboxylic anhydride to directly react with diisocyanate in a polar solvent to form an imide skeleton, and then allowing diol to react with the resultant material in the presence of a catalyst; a material synthesized by mixing diamine with tricarboxylic anhydride in a polar solvent to form an imide skeleton, and then allowing diol to react with the resultant material, or the like. As commercially available polyesterimide, Neoheat 8200K2, Neoheat 8600, LITON 3300 (trade names, manufactured by Totoku Toryo Co., Ltd., for all) or the like can be used.

Polyetherimide (PEI) is not particularly limited, and use can be made of: a material obtained by an ordinary method, for example, by allowing aromatic tetracarboxylic dianhydride to react with aromatic diaminoether and heating the resultant material, or the like. Examples of commercially available polyetherimide include ULTEM (registered trademark) (manufactured by SABIC Innovative Plastics Holding BV).

Herein, the polyamic acid means a material obtained by using, as raw materials, an aromatic diamine, such as p-phenylenediamine, and a tetracarboxylic dianhydride, such as pyromellitic dianhydride, and allowing addition polymerization in a solvent, such as N-methyl-2-pyrrolidone (NMP). Varnish containing the polyamic acid is applied onto the conductor, and a solvent is removed and simultaneously a reaction of forming imide progresses by baking the resultant material at a high temperature, and a polymer excellent in heat resistance, chemical resistance, and electrical insulation performance, can be obtained.

The tetracarboxylic dianhydride is not particularly limited, and in view of improvement of heat resistance and mechanical strength, aromatic tetracarboxylic acid is preferable. Specific examples thereof include: pyromellitic dianhydride, 3,3',4,4'-biphenyl tetracarboxylic dianhydride, 3,3', 4,4'-benzophenone tetracarboxylic dianhydride, 4,4'-oxy diphthalic acid anhydride, and 3,3',4,4'-diphenylsulfone tetracarboxylic dianhydride. Among those, form the viewpoint of reactivity, 3,3',4,4'-biphenyl tetracarboxylic dianhydride and 3,3',4,4'-benzophenone tetracarboxylic dianhydride are preferable.

The aromatic diamine is not particularly limited, and specific examples thereof include: o-phenylene diamine, m-phenylene diamine, p-phenylene diamine, 2,4-diaminotoluene, 2,5-diaminotoluene, 2,4-diaminoxylene, 2,3,5,6-tetramethyl-1,4-phenylene diamine, 1,5-diaminonaphthalene, 2,6-diaminonaphthalene, 4,4'-diaminoterphenyl, 4,4'-diaminobiphenylmethane, 1,2-bis(anilino)ethane, diaminobiphenyl sulfone, 2,2-bis(p-aminophenyl)propane, 3,3'-dimethyl-4,4'-diaminobiphenyl, 3,3'-dimethyl-4,4'- diaminodiphenylether, 1,4-bis(p-aminophenoxy)benzene, and 4,4'-bis-(p-aminophenoxy)biphenyl.

The carboxy group existing in the thermosetting resin interacts with the Al conductor within the range of an amount in which resin performance is not adversely affected, to exhibit an excellent effect on adhesion between the conductor and the adhesion layer. Thus, an acid value (KOH mg/g, KOH required for neutralizing free acid) of the thermosetting resin is preferably 10 to 250 mg/g, more preferably 50 to 230 mg/g, and further preferably 80 to 220 mg/g.

The solvent to be used for forming the resin varnish is not particularly limited, as long as the solvent does not adversely affect a reaction with the thermosetting resin. Examples thereof include: an amide-based solvent, such as N-methyl-2-pyrrolidone (NMP), N,N-dimethylacetamide (DMAc), and N,N-dimethylformamide (DMF); a urea-based solvent, such as N,N-dimethylethyleneurea, N,N-dimethylpropyleneurea, and tetramethylurea; a lactone-based solvent, such as γ-butyrolactone, and γ-caprolactone; a carbonate-based solvent, such as propylene carbonate; a ketone-based solvent, such as methyl ethyl ketone, methyl isobutyl ketone, and cyclohexanone; an ester-based solvent, such as ethyl acetate, n-butyl acetate, butyl cellosolve acetate, butyl carbitol acetate, ethyl cellosolve acetate, and ethyl carbitol acetate; a glyme-based solvent, such as diglyme, triglyme, and tetraglyme; a hydrocarbon-based solvent, such as toluene, xylene, and cyclohexane; and a sulfone-based solvent, such as sulfolane.

Among these solvents, an amide-based solvent or a urea-based solvent is preferable in view of high solubility, high reaction acceleration performance and the like, and because the solvent does not have any hydrogen atom that is apt to inhibit a crosslinking reaction by heat, N-methyl-2-pyrrolidone (NMP), N,N-dimethylacetamide (DMAc), N,N-dimethylethyleneurea, N,N-dimethylpropyleneurea or tetramethylurea is more preferable, and N-methyl-2-pyrrolidone is particularly preferable.

Moreover, from a viewpoint of reducing the number of times of baking, a resin concentration in the varnish is preferably high, and is preferably 15 to 55 mass %, and more preferably 30 to 45 mass %.

(Insulation Layer)

Examples of the thermoplastic resin that can be used for an insulation layer include: general-purpose engineering plastics, including polyamide (PA) (nylon), polyacetal (POM), polycarbonate (PC), polyphenylene ether (including modified polyphenylene ether), polybutylene terephthalate (PBT), polyethylene terephthalate (PET), syndiotactic polystyrene resins (SPS), polyethylene naphthalate (PEN), and ultra-high molecular weight polyethylene; and also super engineering plastics, including polysulfone (PSF), polyethersulfone (PES), polyphenylene sulfide (PPS), polyarylate (PAR), polyetherketone (PEK), polyaryletherketone (PAEK), polyether ether ketone (PEEK), non-crystalline thermoplastic polyimide resins, thermoplastic polyimide resins (TPI), polyamideimide (PAI), polyesterimide (PEsI), and liquid-crystalline polyesters; and further polymer alloys, containing as a base resin polyethylene terephthalate (PET) or polyethylene naphthalate (PEN); and polymer alloys containing the above-described engineering plastics, including ABS (acrylonitrile/butadiene/styrene copolymers)/polycarbonate, polyphenylene ether/nylon 6,6, polyphenylene ether/nylon 6,6, polyphenylene ether/polystyrene, and polybutylene terephthalate/polycarbonate.

In the present invention, in view of heat resistance and stress cracking resistance, syndiotactic polystyrene resin (SPS), polyphenylene sulfide (PPS), polyarylether ketone (PAEK), polyether ether ketone (PEEK) or thermoplastic polyimide resin (TPI) can be particularly preferably used.

In addition, a resin of use is not limited by names of the resins indicated above, and in addition to the resins listed above, any resin obviously can be used if the resin is superior to those resins in terms of performance.

Among those, crystalline thermoplastic resin includes, for example, general-purpose engineering plastics, including polyamide (PA), polyacetal (POM), polybutylene terephthalate (PBT), polyethylene terephthalate (PET), polyphenylene sulfide (PPS), and ultra-high molecular weight polyethylene; and polyether ether ketone (PEEK), polyether ketone (PEK), polyarylether ketone (PAEK) (including modified PEEK), and a thermoplastic polyimide resin (TPI). Moreover, specific examples thereof include a polymer alloy using the above-described crystalline resin. On the other hand, specific examples of amorphous thermoplastic resins include: polycarbonate (PC), polyphenylene ether, polyarylate, syndiotactic polystyrene resin (SPS), polyamideimide (PAI), polybenzimidazole (PBI), polysulfone (PSF), polyether sulfone (PES), polyetherimide (PEI), polyphenyl sulfone (PPSU), and amorphous thermoplastic polyimide resin.

Specific examples of the thermosetting resin that can be used in the insulation layer include: polyimide (PI), polyesterimide, polyamideimide, a phenolic resin, an epoxy resin, polyurethane, an unsaturated polyester resin, a melamine resin, a urea resin, a diallylphthalate resin, and polybenzimidazole. In addition, these thermosetting resins may be modified, and specific examples thereof include silica hybrid polyimide.

In the present invention, in view of being excellent in both flexibility and heat resistance, as the thermosetting resin, polyimide, polyamideimide or polyesterimide is preferable, and polyimide or polyamideimide is more preferable.

Further, in addition to the resins listed above, any resin obviously can be used if the resin is superior to those resins in terms of performance.

In the present invention, any of various additives, such as a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer, may be incorporated into the thermosetting resin to form the insulation layer, to the extent that the characteristics are not adversely affected. Further, a layer formed from a resin containing any of these additives may be laminated on the resulting insulated wire separately from the insulation layer, or the insulated wire may be coated with a coating material containing any of these additives.

In the present invention, among these thermoplastic resins and thermosetting resins, with regard to the crystalline thermoplastic resins, a melting point is preferably 180° C. or higher, more preferably 240° C. or higher, and further preferably 250° C. or higher. Moreover, with regard to the amorphous thermoplastic resins or thermosetting resins, a glass transition temperature is preferably 180° C. or higher, more preferably 240° C. or higher, and further preferably 250° C. or higher. Among those, the thermosetting resin is most preferable.

In addition, in the present invention, an upper limit of the melting point or the glass transition temperature is not particularly limited, but practically the melting temperature is 450° C. or lower, and the glass transition temperature of the amorphous resin is 350° C. or lower.

Herein, when the resin with which the insulation layer is formed is a mixed resin in which a plurality of resins are mixed, a melting point or a glass transition temperature obtained in the mixed resin is applied, and a value observed at the highest temperature thereamong is taken as a capability value.

Specific examples of a crystalline thermoplastic resin having a melting point of 180° C. or higher include: a thermoplastic polyimide resin (TPI) (Tm. 388° C.), polyphenylene sulfide (PPS) (Tm. 275° C.), polyether ether ketone (PEEK) (Tm. 340° C.), polyarylether ketone (PAEK) (Tm. 340° C.), and polyesterimide (PEsI) (Tm. 180° C.), and polyphenylene sulfide or polyesterimide is preferable.

Specific examples of an amorphous thermoplastic resin or thermosetting resin each having a glass transition temperature of 180° C. or higher include: a thermoplastic polyimide resin (Tg. 250° C.), polyimide (PI) (Tg. 400° C. or higher), polyamideimide (PAI) (Tg. 280 to 290° C.), a syndiotactic polystyrene resin (SPS) (Tg. 280° C.), and polyesterimide (PEsI) (Tg. 180° C.), and among those, polyimide or polyamideimide is preferable.

The melting point can be measured by observing a fusion point, under conditions of: 10 mg of a sample and a heating rate of 5° C./min by using a differential scanning calorimeter "DSC-60" (manufactured by Shimadzu Corporation). The glass transition temperature can be measured by observing a glass transition temperature, under conditions of: 10 mg of a sample and a heating rate of 5° C./min by using DSC-60, in a manner similar to the melting point.

In the present invention, with regard to the insulation layer, a main component of the thermosetting resin having the glass transition temperature of 180° C. or higher is preferably polyamideimide or/and polyimide.

Herein, "a main component" means a component over 50 mass % of the resin with which the insulation layer is formed, and the content is preferably 55 mass % or more, more preferably 65 mass % or more, and further preferably 75 mass % or more.

Moreover, a layer of the thermosetting resin having the glass transition temperature of 180° C. or higher preferably includes a mixture of polyamideimide and polyimide, and a mass ratio of polyamideimide:polyimide is preferably 5:95 to 95:5, and more preferably 20:80 to 80:20.

When the layer is formed in such a manner that the partial discharge is increased by configuring the reinforcement insulation layer, while high heat resistance and abrasion resistance are maintained, in comparison with the case where the thermosetting resin being the component in the adhesion layer and the insulation layer is baked with a large thickness, even if the film thickness is increased to a degree at which the high partial discharge inception voltage can be realized, the number of times of passing through the baking furnace upon forming the adhesion layer and the insulation layer can be reduced, and the adhesion force between the conductor and the adhesion layer can be maintained. In view of capability of preventing lowering in the adhesion force, a thickness of the insulation layer is preferably 2 μm or more and 85 μm or less, more preferably 15 μm or more and 50 μm or less, and further preferably 20 μm or more and 30 μm or less.

Moreover, in order to avoid adversely affecting withstand voltage performance and heat resistance, which are characteristics required for the insulated wire, the insulation layer preferably has a predetermined thickness. A thickness of the thermosetting resin per one-time baking is not particularly limited, as long as the thickness is at a degree of causing no pinholes, and is preferably 2 μm or more, and more preferably 6 μm or more.

In this preferable embodiment, the total thickness in each side of at least the first two sides in the total thickness of the adhesion layer and the insulation layer provided in the first two sides and the second two sides, is adjusted to 85 μm or less.

The method of baking the thermosetting resin on the rectangular Al conductor may be in a usual manner. Examples of the baking method include: a method of employing a die for a coating varnish, which die has been formed so as to be similar to the shape of the conductor, and a method of employing a die that is called "universal die", which has been formed in a curb (well curb) shape when the cross-sectional shape of the conductor is quadrangular (rectangular). The conductor having the varnish of any of these resins coated thereon is baked by a baking furnace in a usual manner. The coating layer of the thermosetting resin can be formed, by applying resin varnish containing the above-mentioned insulation layer on the conductor once, or preferably a plurality of times, and baking the resultant material. Although specific baking conditions depend on the shape of a furnace to be used or a wind speed, if the furnace is an about 5 m-sized vertical furnace by natural convection, the baking can be achieved by setting the passing time period to 10 to 90 sec at the temperature of 400 to 500° C.

As a method of covering with the thermoplastic resin on an enameled wire, a method may be in a usual manner. Specific examples include: a method of using the obtained enameled wire as a core wire and performing extrusion covering with the thermoplastic resin on the enameled wire by using a screw of an extruder. On this occasion, extrusion covering with the thermoplastic resin is performed, by using an extrusion die at a temperature equal to or higher than the melting point of the thermoplastic resin (equal to or higher than the glass transition temperature in the case of the amorphous resin), so as to be analogous to a shape of the conductor in an outer shape of a cross section of an extrusion covering resin layer, and to be a shape capable of obtaining a predetermined thickness in a side portion and a corner portion.

In addition, a thermoplastic resin layer can also be formed by using an organic solvent or the like and a thermoplastic resin.

(Reinforcement Insulation Layer)

With regard to the reinforcement insulation layer in the insulated wire of the present invention, in order to obtain the insulated wire having the high partial discharge inception voltage, at least one reinforcement insulation layer is provided outside the adhesion layer and the insulation layer, and the reinforcement insulation layer may be one layer or a plurality of layers.

The reinforcement insulation layer only needs to be selected from the thermoplastic resin or the thermosetting resin, and a method of forming the reinforcement insulation layer may be applied by extrusion or insulated tape winding.

When the reinforcement insulation layer is formed of the thermoplastic resin, extrusion is preferable in order to stabilize a coating thickness thereof. In the present invention, as the thermoplastic resin which is excellent in heat resistance and chemical resistance, a thermoplastic resin, such as engineering plastics or super-engineering plastics is preferable, for example.

As the reinforcement insulation layer which can be formed by tape winding, use can be made of: a polyamide insulating paper, a polyimide insulating paper, a flame retardant polyester-based film, or the like. In view of having flexibility and heat resistance, as the polyamide insulating paper, a Nomex (registered trademark) paper (an Aramid (wholly aromatic polyamide) polymer paper, manufactured by E. I. du Pont de Nemours & Company) is used in the Examples. When particularly high heat resistance is provided therefor, a Kapton (registered trademark) film (polyimide film, manufactured by DU PONT-TORAY CO., LTD.) or the like can also be used. In addition thereto, according to characteristics, DIALAMY (registered trademark) (flame retardant polyester-based film, manufactured by Mitsubishi Plastics, Inc.), Vulcanized Fibre Paper (trade name, manufactured by Hokuetsu Toyo Fibre Co., Ltd.) or the like can be used.

If forming of the reinforcement insulation layer is performed by a forming method other than the method of baking the varnish, it is unnecessary to increase a baking step, that is, a heat quantity to be applied to the conductor can be significantly reduced, and thus thermal aging resistance or workability is improved, which is preferable.

In view of being excellent in bonding strength and also solvent resistance, the reinforcement insulation layer is preferably formed of a thermoplastic resin having a glass transition temperature or melting point equal to or higher than 250° C., and more preferably a thermoplastic resin having a glass transition temperature or melting point equal to or higher than 270° C. The glass transition temperature or melting point of a resin to be used in the reinforcement insulation layer is preferably 200° C. or higher, and more preferably 300° C. or higher, for example. The glass transition temperature or melting point of the thermoplastic resin can be measured by the above-mentioned method, in accordance with differential scanning calorimetry (DSC). In addition, any melting point may be applied if the melting point is equal to or higher than a value mentioned later.

Specific examples of the thermoplastic resins with which the reinforcement insulation layer is formed include: polyether ether ketone (PEEK) (Tm. 340° C.), modified polyether ether ketone (modified-PEEK) (Tm. 340° C.), a thermoplastic polyimide resin (TPI) (Tm. 388° C.), polyamide having an aromatic ring (hereinafter, referred to as aromatic polyamide) (Tm. 306° C.), polyester having an aromatic ring (hereinafter, referred to as aromatic polyester) (Tm. 220° C.), polyether ketone (PEK) (Tm. 373° C.), polyphenylene sulfide (PPS) (Tm. 275° C.), and polybutylene terephthalate (PBT) (Tm. 228° C.). Among those, at least one thermoplastic resin selected form the group consisting of polyether ether ketone, modified polyether ether ketone, a thermoplastic polyimide resin (TPI), aromatic polyamide, polyphenylene sulfide, and polybutylene terephthalate is preferable; polyether ether ketone, modified polyether ether ketone, a thermoplastic polyimide resin (TPI), or polyphenylene sulfide is more preferable; and polyether ether ketone, a thermoplastic polyimide resin (TPI), or polyphenylene sulfide is further preferable.

Among these thermoplastic resins, a thermoplastic resin in which a melting point is 180° C. or higher and relative permittivity is preferably 4.5 or less is used. One kind of the thermoplastic resin may be used alone, or two or more kinds may also be used. In addition, the thermoplastic resin may be a material in which any of other resins, an elastomer, and the like are blended, as long as at least the melting point is 180° C. or higher.

The thickness of the reinforcement insulation layer is preferably 200 µm or less, and in realizing the advantageous effects of the present invention, more preferably 180 µm or less, and further preferably 130 µm or less. If the thickness of reinforcement insulation layer is excessively large, a whitened portion is occurred on a surface of the insulated wire in several cases, when the insulated wire is wound around an iron core and heated, without depending on a proportion of crystallinity of the coating in the reinforcement layer as mentioned later. Thus, if the thickness of the reinforcement insulation layer is excessively large, the resin layer itself has stiffness, and thus such a material becomes poor in flexibility as the insulated wire to affect adversely, in several cases, characteristics of maintaining electrical insulation, particularly the thermal aging resistance before and after working.

On the other hand, in view of capability of preventing poor insulation, the thickness of the reinforcement insulation layer is preferably 20 µm or more, more preferably 50 µm or more, and further preferably 60 µm or more.

In this preferable embodiment, each of the thickness of the reinforcement insulation layer provided in the first two sides and the second two sides is preferably 200 µm or less, more preferably 180 µm or less, and further preferably 130 µm or less.

In the present invention, crystallinity of the crystalline thermoplastic resin is not particularly limited, and is preferably 30 to 100%, and more preferably 50 to 100%, for example.

The crystallinity is expressed in terms of a value that can be measured by applying differential scanning calorimetry (DSC) to exhibit a degree at which the crystalline thermoplastic resin is arranged in a regular manner. With regard to the crystallinity, for example, when polyphenylene sulfide (PPS) is used as the thermoplastic resin, a proper amount in a non-foamed region is collected, and temperature is raised at a rate of, for example, 5° C./min, to calculate an endothermic quantity (melting heat quantity) caused by melting as seen in a region over 300° C., and an exothermic quantity (crystallization heat quantity) caused by crystallization as seen around 150° C., and a differential of the heat quantity obtained by subtracting the crystallization heat quantity from the melting heat quantity relative to the melting heat quantity is taken as the crystallinity. A calculation formula therefor is shown below.

Calculation formula:
Crystallinity (%)=[{(melting heat quantity)−(crystallization heat quantity)}/(melting heat quantity)]×100

In addition, also when a crystalline thermoplastic resin other than PPS is used, although a melting peak temperature and a crystallization peak temperature are different each other, the crystallinity can be calculated in a manner similar to the above-described calculation formula.

The crystallinity can be adjusted by preheating the thermoplastic resin on a side of the conductor immediately before forming of the thermoplastic resin layer, for example. In general, when a preheating temperature on the side of the conductor is significantly lower than a temperature of forming the thermoplastic resin layer, the crystallinity is low, and when the preheating temperature is higher, the crystallinity of the thermoplastic resin becomes high.

(Outermost Layer)

The outermost layer herein can provide the insulated wire with a function different from insulation performance. Specific examples include: a bonding layer, a corona discharge-resistant layer, a partial discharge-resistant layer, a semi-conducting layer, a light-resistant layer, and a coloring layer. As a result, even a change in the insulation performance as an insulated wire coating causes no problem. Moreover, it is not essential to provide the outermost layer, and the above-described reinforcement insulation layer may serve as the outermost layer.

When the outermost layer is not the above-described reinforcement insulation layer, a thickness of the outermost layer is preferably 5 to 50 μm, and more preferably 10 to 30 μm.

In the preset invention, the total thickness of the adhesion layer, the insulation layer, and the reinforcement insulation layer is preferably 50 μm or more. If the total thickness is 50 μm or more, the partial discharge inception voltage of the insulated wire reaches 1,000 Vp or more, and inverter surge deterioration can be prevented. In view of capability of developing a further higher partial discharge inception voltage and preventing the inverter surge deterioration to a high degree, this total thickness is preferably 75 μm or more, and more preferably 100 μm or more.

In this preferable embodiment, each of the total thickness of the adhesion layer, the insulation layer, and the reinforcement insulation layer provided in the first two sides and the second two sides is adjusted to 50 μm or more. Thus, if the total thickness of the adhesion layer and the insulation layer is adjusted to 85 μm or less, the thickness of the reinforcement insulation layer is adjusted to 200 μm or less, and the total thickness of the adhesion layer, the insulation layer, and the reinforcement insulation layer is adjusted to 50 μm or more, at least, improvement in the partial discharge inception voltage of the insulated wire, namely prevention of the inverter surge deterioration, bonding strength between the conductor and the adhesion layer, and bonding strength of the coating can be satisfied. In addition, the total thickness of all of the coatings on the conductor is preferably 280 μm or less, and in order to satisfactorily enable working without problems, in consideration of the characteristics of maintaining electrical insulation before and after the working, more preferably 250 μm or less.

Accordingly, in the insulated wire in this preferable embodiment, the conductor and the adhesion layer are adhered with high bonding strength. An evaluation can be made on workability between the conductor and the coating by the number of turns until floating of the adhesion layer is caused, by conducting a test in the manner same with the procedures in 5.1 Winding tests in 5. Flexibility and adhesion in "Winding wires-Test methods", JIS C 3216-3, for example.

The insulated wire in this preferable embodiment is excellent in the bonding strength between the Al conductor and the adhesion layer, and is further excellent in the thermal aging resistance, as mentioned later.

Moreover, the insulated wire in this preferable embodiment is excellent in the thermal aging resistance. This thermal aging resistance serves as an indicator for keeping reliability of causing no lowering in insulation performance for a long period of time even if the wire is used in a high-temperature environment. For example, an evaluation can be made with the naked eye on existence or non-existence of cracks caused on the coating, by allowing a wire wound according to 5.1 Windings tests in 5. Flexibility and adhesion in "Winding wires-Test methods", JIS C 3216-3, to stand in a high-temperature chamber at 190° C. for 1,000 hours. Even if the insulated wire in this preferable embodiment is used in the high-temperature environment, and even after the insulated wire is allowed to stand for a further longer period of time, for example, for 1,500 hours, the insulated wire can maintain the thermal aging resistance.

In the insulated wire in this preferable embodiment, cracks are unconfirmable on any of layers of the coating, obviously for 1,000 hours or even for 1,500 hours. The insulated wire is excellent in the thermal aging resistance, and even if the insulated wire is used in the high-temperature environment, can maintain reliability in a further longer period of time.

The insulated wire of the present invention, as mentioned above, is formed by: composing, on the Al conductor, the thermosetting resin layer formed by baking the varnish containing the carboxy group, as a suitable adhesion layer; and having, as the outer layer of the adhesion layer, the insulation layer and the reinforcement insulation layer each having heat resistance. Thus, the Al conductor insulated wire can be provided, which is excellent in the abrasion resistance and the thermal aging resistance, each of which have been recently required for the insulated wire; the received heat quantity of the Al conductor can be lowered by reduction of the number of times of baking of the adhesion layer; and lowering in rupture strength of the conductor can be suppressed. Moreover, an abrasion test in one direction serves as an indicator of a degree of scratching received when the insulated wire is worked into a motor or the like.

An evaluation can be made on the rupture strength of the conductor after the insulated wire is worked in terms of physical strength when, with reference to JA.5.2.2 Enameled rectangular wires in JA.5.2 Adhesion in "Winding wires-Test methods", JIS C 3216-3, the adhesion layer, the insulation layer, the reinforcement insulation layer, and the outermost layer of the worked insulated wire are peeled off to expose the conductor, and then three specimens each having a length of about 35 cm are taken on this conductor, a gauge length is adjusted to 250 mm, and each test specimen is elongated at a tensile speed of 300 mm per minute until the test specimen is ruptured (broken), for example. In addition, as the winding wire having sufficient physical strength, a measured value is preferably 20 N/mm$^2$ or more, and as the winding wire having satisfactory physical strength, the measured value is preferably 40 N/mm$^2$ or more.

An evaluation can be made on the abrasion resistance, at 25° C., in a manner same with the procedures in 6. Abrasion resistance (applied to enameled round wires) in "Winding wires-Test methods", JIS C 3216-3, for example. In the case of a rectangular wire having a rectangular cross section, the evaluation is made on each corner of four corners. Specifically, a test specimen is slid in one direction under a predetermined load until the coating is peeled off, by using an abrasion tester specified in JIS C 3216-3. The evaluation can be made by reading a scale at which the coating is peeled off, and calculating a product of this scale value and the load used therefor.

In the insulated wire in this preferable embodiment, the above-mentioned product of the scale value and the load used therefor reaches 2,000 gf or more.

Another preferable embodiment of the present invention is an insulated wire having, on an outer periphery of an Al conductor, at least one layer of an adhesion layer, an insulation layer outside the adhesion layer, and further a reinforcement insulation layer as an outer layer of the insulation layer, in which bond strength, workability, and the thermal aging resistance are enhanced.

In addition, the adhesion layer, the insulation layer, and the reinforcement insulation layer are basically the same with the adhesion layer, the insulation layer, and the reinforcement insulation layer as mentioned above.

The resins which may be formed as the insulation layer and the reinforcement insulation layer, ordinarily do not substantially contain a partial discharge-resistant substance.

Herein, the "partial discharge-resistant substance" means an insulation material which is less susceptible to partial discharge deterioration, and a substance having action of improving charge life characteristic by being dispersed into an insulation coating of the electric wire. Examples of the partial discharge-resistant substance include: oxide (an oxide of a metal or non-metallic element), nitride, glass, and mica; and specific examples include: fine particles of silica, titanium dioxide, alumina, barium titanate, zinc oxide, and gallium nitride.

Moreover, an expression "do not substantially contain" the partial discharge-resistant substance means that the partial discharge-resistant substances is not positively incorporated into the insulation layer and the reinforcement insulation layer, and involves the case where the substance is not completely incorporated, and also the case where the substance is incorporated in a content at a degree at which the purpose of the present invention is not adversely affected. Specific examples of the content at the degree at which the purpose of the present invention is not adversely affected include: a content of 30 mass parts or less to 100 mass parts of a resin component with which the insulation layer and the reinforcement insulation layer are formed. In particular, when a powder is added to the layer, a dispersing agent may be added together.

Into the thermosetting resin or the thermoplastic resin with which the insulation layer and the reinforcement insulation layer are formed, formulated may be any of various additives, such as an antioxidant, an antistatic agent, an ultraviolet light inhibitor, a light stabilizer, a fluorescent whitening agent, a pigment, a dye, a compatibilizer, a slipping agent, a reinforcing agent, a flame retardant, a crosslinking agent, a crosslinking aid, a plasticizer, a viscosity improver, a viscosity reducing agent, and an elastomer, within the range in which the characteristics are not adversely affected.

In the case where bond strength between the insulation layer and the reinforcement insulation layer is insufficient, when bending is performed under severe conditions, for example, into a small radius, wrinkles are occurred, in several cases, in the reinforcement insulation layer corresponding to a part inside an arc of bending. If such the wrinkles are occurred, a space (a gup) is formed between the insulation layer and the reinforcement insulation layer, leading to a phenomenon in which the partial discharge inception voltage is lowered in several cases.

In order to prevent lowering in this partial discharge inception voltage, it is necessary to avoid occurrence of the wrinkles inside the arc of bending. Occurrence of the wrinkles as described above can be prevented to a high degree, by further enhancing the bonding strength by introducing a layer having a bonding function between the insulation layer and the reinforcement insulation layer.

That is, the insulated wire of the present invention is high in the bonding strength between the adhesion layer and the Al conductor to exhibit high abrasion resistance, and further higher abrasion resistance can be exhibited by providing a bond layer between the insulation layer and the reinforcement insulation layer, and breaking of the coating by strong working can be effectively prevented.

In the insulated wire of the present invention, the bond layer may be entered within an insulation multilayer. The "bond layer" means a layer with which bond strength between the reinforcement insulation layer and the insulation layer can be improved. Moreover, the "insulation multilayer" means a group of insulation layers in which any of the layers exhibits insulation, although the resin components in the layers in contact with each other are different, as in the layer formed of two layers of the insulation layer and the reinforcement insulation layer in the present invention.

Specifically, there exists the case where, if the layer of the thermosetting resin (for example, the insulation layer according to the present invention) and the layer of the thermoplastic resin (for example, the reinforcement insulation layer according to the present invention) are adjacent to each other in the insulation multilayer, the bond force (adhesion force) between the two layers is reduced, for example. In this case, an insulated wire having high workability can be produced, by baking a varnished thermoplastic resin between the two layers into the bond layer, and thermally fusing the insulation layer with the reinforcement insulation layer.

In order to sufficiently cause thermal fusion when the reinforcement insulation layer is formed after the formation of the insulation layer according to this production method, in an extrusion covering step, a heating temperature of the thermoplastic resin with which the reinforcement insulation layer is formed is preferably a temperature equal to or higher than a glass transition temperature (Tg) of the thermoplastic resin with which the bond layer is formed, and more preferably a temperature higher, by 30° C. or more, than the Tg, and further preferably a temperature higher, by 50° C. or more, than the Tg. Herein, the "heating temperature of thermoplastic resin with which the extrusion covering resin layer is formed" means a temperature of a die unit.

As a solvent of forming, into the varnish, the thermoplastic resin with which the bond layer is formed, any kind of solvent can be applied as long as the solvent can dissolve a selected thermoplastic resin thereinto.

The thermoplastic resin that can be used for this purpose is preferably an amorphous resin, in view of difficulty in occurring a stress by a change of states, such as being crystallized and shrunk by heat. For example, at least one selected from: polyetherimide (PEI), polyether sulfone, polyphenylene ether, polyphenyl sulfone (PPSU), and an amorphous thermoplastic polyimide resin, is preferable. As the polyetherimide, ULTEM (registered trademark) (manufactured by SABIC Innovative Plastics Holding BV) can be used, for example. As the polyether sulfone, Sumikaexcel (registered trademark) PES (trade name, manufactured by Sumitomo Chemical Co., Ltd.), PES (trade name, manufactured by Mitsui Fine Chemicals, Inc.), Ultrason (registered trademark) E (trade name, manufactured by BASF Japan Ltd.), and Radel (registered trademark) A (trade name, manufactured by Solvay Specialty Polymers Japan K.K.) can be used, for example. As the polyphenylene ether, Xyron (registered trademark) (manufactured by Asahi Kasei Chemicals Corporation), and Lupiace (registered trademark) (manufactured by Mitsubishi Engineering-Plastics Corporation) can be used, for example. As the polyphenyl sulfone, Radel (registered trademark) R (trade name, manufactured by Solvay Specialty Polymers Japan K.K.) can be used, for example. As the amorphous thermoplastic polyimide resin, U-Varnish (trade name, manufactured by Ube Industries, Ltd.), HCl series (trade names, manufactured by Hitachi Chemical Company, Ltd.), U Imide (trade name, manufactured by Unitika Ltd.), and AURUM (registered trademark) (manufactured by Mitsui Chemicals, Inc.) can be used, for example. In view of being readily dissolvable into a solvent, polyphenyl sulfone or polyetherimide is more preferable.

In the present invention, "amorphous" means keeping of a shapeless state substantially without a crystalline structure, and characteristics in which chains of a polymer are formed into a random state upon curing.

<Method of Producing Insulated Wire>

As shown in FIG. 1 and FIG. 2, an insulated wire is preferably produced, as mentioned above, by forming an adhesion layer 2 by applying, onto an aluminum conductor 1, varnish containing a carboxy group, and baking the resultant material, providing an insulation layer 3 as an outer layer of the adhesion layer 2, and then performing extrusion of a thermoplastic resin as an outer layer of the insulation layer 3, to form a reinforcement insulation layer 4. Moreover, when necessary, an outermost layer 5 is preferably formed as an outer layer of the reinforcement insulation layer 4.

EXAMPLES

The present invention will be described in more detail based on examples given below, but the invention is not meant to be limited by these.

In addition, unless otherwise specified, a thickness of a covering layer is the same in any one of four sides.

Example 1

Each varnish was applied by dip coating and adjusted in an application amount by a die. Specifically, a 5 µm-thick adhesion layer was formed by: applying, on a rectangular conductor (made of 99% purity aluminum) having a rectangular cross section (long side 3.0 mm short side 1.6 mm, r=0.5 mm in which r is a curvature radius of chamfering of four corners), polyimide varnish prepared by adjusting polyimide (PI-1) (trade name U Imide, manufactured by Unitika Ltd.) with N-methyl-2-pyrrolidone (NMP) into 20 mass % in a resin component; and baking the resultant material in a 5-m vertical furnace of natural convection-type under conditions of a furnace temperature of 500° C. and a passing period of time of 30 seconds.

Then, a 30 µm-thick insulation layer was formed by: applying, onto the adhesion layer, mixed varnish in which polyimide:polyamideimide was 39:61 in a solid content mass ratio, as obtained by mixing, in an equal mass, the above-described polyimide (PI-1) (trade name U Imide, manufactured by Unitika Ltd.) varnish and polyamideimide (PAI-2) varnish [trade name HPC-5000, solid concentration 30%, solvent composition ratio (mass) NMP/xylene=70/30, manufactured by Hitachi Chemical Company, Ltd.]); and baking the resultant material in a 5-m vertical furnace of natural convection-type under conditions of a furnace temperature of 500° C. and a passing period of time of 30 seconds.

An insulated wire was prepared by: forming a 100 µm-thick reinforcement insulation layer by further performing, onto an upper layer thereof, extrusion covering of polyphenylene sulfide (PPS) (trade name TORELINA, manufactured by Toray Industries, Inc.) by using an extrusion die; and then performing water cooling at an interval of time of 10 seconds.

Example 2

An insulated wire having a configuration in Table 1 below was prepared in a manner similar to Example 1.

Where, for an insulation layer, in place of the polyimide/polyamideimide mixed varnish, polyimide (PI-2) varnish [trade name COMPOCERAN H850D (N,N-dimethylacetamide (DMAc) solution, cured residue 15%, 2 mass % of silica in the cured residue), manufactured by Arakawa Chemical Industries, Ltd.] of a type different from the adhesion layer was used, and for a reinforcement insulation layer, in place of PPS, polyether ether ketone (PEEK) (trade name KetaSpire, manufactured by Solvay Specialty Polymers Japan K.K.) was used.

Example 3

An adhesion layer, an insulation layer, and a reinforcement insulation layer each having a configuration in Table 1 were provided onto the aluminum conductor used in Example 1, in a manner similar to Example 1.

Where, for an insulation layer, in place of the polyimide/polyamideimide mixed varnish, polyamideimide (PAI-2) varnish [trade name HPC-5000, solid concentration 30%, solvent composition ratio (mass) NMP/xylene=70/30, manufactured by Hitachi Chemical Company, Ltd.] was used, and for a reinforcement insulation layer, in place of PPS, polyether ether ketone (PEEK) used in Example 2 was used.

An insulated wire was prepared by: forming a 5 µm-thick outermost layer, by applying, onto the above-described reinforcement insulation layer, varnish prepared by adjusting polyurethane (trade name TPU F2-NCA, manufactured by Totoku Toryo Co., Ltd.) with cresol into 30 mass % in a resin component; and then baking the resultant material.

Example 4

An insulated wire having a configuration in Table 1 below was prepared in a manner similar to Example 1.

Where, as an aluminum conductor, a material having purity in Table 1 below was used, and for an adhesion layer, in place of polyimide, polyesterimide (PEsI) (tradename Neoheat 8600A, manufactured by Totoku Toryo Co., Ltd.) was used.

Example 5

An insulated wire having a configuration in Table 1 below was prepared in a manner similar to Example 3.

Where, as an aluminum conductor, a material having purity in Table 1 below was used, and for an adhesion layer, in place of polyimide, polyester (PEst) (trade name LITON 2100S, manufactured by Totoku Toryo Co., Ltd.) was used, and for an insulation layer, in place of polyamideimide, the polyimide 1)/polyamideimide (PAI-2) mixed varnish used in Example 1 was used, and for an outermost layer, in place of polyurethane, polyamideimide (PAI-2) varnish [trade name HPC-5000, solid concentration 30%, solvent composition ratio (mass) NMP/xylene=70/30, manufactured by Hitachi Chemical Company, Ltd.] was used.

Example 6

An adhesion layer and an insulation layer each having a configuration in Table 1 below were provided onto the aluminum conductor used in Example 1 in a manner similar to Example 1.

Where, with regard to purity of the aluminum conductor, a material having purity in Table 1 below was used, and for the adhesion layer, in place of polyimide, polyamideimide (PAW) varnish [trade name HI-406 (NMP solution of 32 mass % in a resin component), manufactured by Hitachi Chemical Company, Ltd.] was used, and for the insulation layer, in place of the polyimide/polyamideimide mixed varnish, polyamideimide (PAI-2) varnish [trade name HPC-5000, solid concentration 30%, solvent composition ratio (mass) NMP/xylene=70/30, manufactured by Hitachi Chemical Company, Ltd.] of a type different from the above-described adhesion layer was used.

An insulated wire was prepared by: forming a reinforcement insulation layer by further performing, onto the insulation layer, tape winding of a polyamide paper (trade name Nomex paper, manufactured by E. I. du Pont de Nemours and Company); and forming a 10 μm-thick outermost layer by performing onto the reinforcement insulation layer, extrusion covering of thermoplastic polyimide (TPI) (trade name AURUM, manufactured by Mitsui Chemicals, Inc.) by using an extrusion die, and then performing water cooling at an interval of time of 10 seconds.

Example 7

An adhesion layer, an insulation layer, and a reinforcement insulation layer each having a configuration in Table 1 below were provided in a manner similar to Example 6.

Where, for the adhesion layer, in place of polyamideimide, polyetherimide (PEI) (trade name ULTEM, manufactured by SABIC Innovative Plastics Holding BV) was used; and for the insulation layer, in place of polyamideimide, the polyimide (PI-1)/polyamideimide (PAI-2) mixed varnish used in Example 1 was used; and in place of the polyamide paper, a polyimide tape (trade name Kapton, manufactured by DU PONT-TORAY CO., LTD.) was used. In addition, no outermost layer was provided, which was different from Example 6.

Example 8

An adhesion layer, an insulation layer, a reinforcement insulation layer, and an outermost layer each having a configuration in Table 2 below were provided in a manner similar to Example 6.

Where, for the adhesion layer, in place of polyamideimide, the polyimide (PI-1)/polyamideimide (PAI-2) mixed varnish used in the insulation layer in Example 1 was used; and for the insulation layer, in place of polyamideimide, the polyesterimide (PEsI) used in the adhesion layer in Example 4 was used.

Example 9

An adhesion layer, an insulation layer, and a reinforcement insulation layer each having a configuration in Table 2 below were provided in a manner similar to Example 1.

Where, with regard to purity of an aluminum conductor, a material having purity in Table 2 below was used; and for the reinforcement insulation layer, in place of PPS, the PEEK used in Example 2 was used.

Further, a 20 μm-thick outermost layer was formed by: performing, onto the reinforcement insulation layer, extrusion covering of polyamide (trade name Amilan, 66 Nylon, manufactured by Toray Industries, Inc.) by using an extrusion die; and then performing water cooling at an interval of time of 10 seconds.

Example 10

An adhesion layer, an insulation layer, a reinforcement insulation layer, and an outermost layer each having a configuration in Table 2 below were provided in a manner similar to Example 9.

Where, with regard to purity of an aluminum conductor, a material having purity in Table 2 below was used; and for the reinforcement insulation layer, in place of PEEK, polybutylene terephthalate (PBT) (trade name Novaduran; Tg 225° C., manufactured by Mitsubishi Engineering-Plastics Corporation) was used.

Example 11

An adhesion layer, an insulation layer, and a reinforcement insulation layer each having a configuration in Table 2 below were provided in a manner similar to Example 1.

Example 12

An adhesion layer, an insulation layer, a reinforcement insulation layer, and an outermost layer each having a configuration in Table 2 below were provided in a manner similar to Example 9.

Where, for the insulation layer, in place of the polyimide/polyamideimide mixed varnish, the polyphenylene sulfide (PPS) used in the reinforcement insulation layer in Example 1 was used.

Example 13

An adhesion layer, an insulation layer, and a reinforcement insulation layer each having a configuration in Table 2 below were provided in a manner similar to Example 1.

Where, for the insulation layer, in place of the polyimide/polyamideimide mixed varnish, polyimide (PI-2) varnish [trade name COMPOCERAN H850D, manufactured by Arakawa Chemical Industries, Ltd., (DMAc solution, cured residue 15%, 2 mass % of silica in the cured residue)] of a type different from the adhesion layer was used; and for the reinforcement insulation layer, in place of PPS, the thermoplastic polyimide (TPI) used in the outermost layer in Example 6 was used.

In addition, the insulated wires in Examples 3, 5, 6, 8 to 10, and 12 each had a covering layer of four layers as shown in FIG. 1, other than a difference in the thickness; and the insulated wires in Examples 1, 2, 4, 7, 11, and 13 each have no outermost layer 5 in FIG. 1.

Comparative Example 1

An adhesion layer, an insulation layer, and a reinforcement insulation layer each having a configuration in Table 3 below were provided in a manner similar to Example 1.

Where, with regard to the conductor, the 99% purity aluminum conductor was changed to a 99% purity copper conductor.

Comparative Example 2

An adhesion layer, an insulation layer, and a reinforcement insulation layer each having a configuration in Table 3 below were provided in a manner similar to Comparative Example 1.

Where, for the adhesion layer, in place of polyimide, the polyamideimide (PAI-1) used in Example 6 was used; and for the reinforcement insulation layer, the polyether ether ketone (PEEK) used in Example 2 was used.

Comparative Example 3

An adhesion layer, an insulation layer, and a reinforcement insulation layer each having a configuration in Table 3 below were provided in a manner similar to Example 1.

Where, the adhesion layer was formed on the conductor by performing extrusion covering using an extrusion die, in place of polyimide, the polyphenylene sulfide (PPS) used in the reinforcement insulation layer in Example 1.

Comparative Example 4

An insulated wire was prepared by: forming a reinforcement insulation layer having a thickness described in Table 3 below, by performing, onto the aluminum conductor used in Example 2, extrusion covering using the PEEK used in Example 2 by using an extrusion die, and then performing water cooling at an interval of time of 10 seconds.

Comparative Example 5

An adhesion layer and an insulation layer each having a configuration in Table 3 below were provided in a manner similar to Example 1.

In addition, no reinforcement insulation layer was provided, which was different from Example 1.

In the following, the resins used were described for each layer.

Herein, polyimide and polyamideimide have resins different in corresponding thereto for each, and thus expressed by distinguishing the resins as PI-1, PI-2, PAI-1 and PAI-2.

Moreover, the resins were expressed by using the following abbreviations in Tables 1 to 3 below.

(Adhesion Layer)

PI-1 (trade name U Imide, acid value KOH 180 mg/g, manufactured by Unitika Ltd.)

PEsl (trade name Neoheat 8600A; acid value KOH 150 mg/g, manufactured by Totoku Toryo Co., Ltd.)

PEst (trade name LITON 2100S; acid value KOH 20 mg/g, manufactured by Totoku Toryo Co., Ltd.)

PAI-1 (trade name HI-406; acid value KOH 10 mg/g, manufactured by Hitachi Chemical Company, Ltd.)

PAI-2 (trade name HPC-5000; acid value KOH 20 to 40 mg/g, manufactured by Hitachi Chemical Company, Ltd.)

PEI (trade name ULTEM; KOH 10 mg/g, manufactured by SABIC Innovative Plastics Holding BV)

PPS (trade name TORELINA; having no carboxy group, acid value KOH 0 mg/g, manufactured by Toray Industries, Inc.)

(Insulation Layer)

PI-1 (trade name U Imide; Tg 400° C. or higher, manufactured by Unitika Ltd.)

PI-2 (trade name COMPOCERAN H850D; Tg 400° C. or higher, manufactured by Arakawa Chemical Industries, Ltd.)

PAI-2 (trade name HPC-5000; Tg 280° C., manufactured by Hitachi Chemical Company, Ltd.)

PEsl (trade name Neoheat 8600A; Tg 180° C., manufactured by Totoku Toryo Co., Ltd.)

PPS (trade name TORELINA; Tg 278° C., manufactured by Toray Industries, Inc.)

(Reinforcement Insulation Layer)

PPS (trade name TORELINA; Tm 278° C., manufactured by Toray Industries, Inc.)

PEEK (trade name KetaSpire KT-820; Tm 340° C., manufactured by Solvay Specialty Polymers Japan K.K.)

Polyamide paper (trade name Nomex Paper; Tg 260° C., manufactured by E. I. du Pont de Nemours and Company)

Polyimide tape (trade name Kapton; Tg 400° C. or higher, manufactured by DU PONT-TORAY CO., LTD.)

PBT (trade name Novaduran; Tg 225° C., manufactured by Mitsubishi Engineering-Plastics Corporation)

TPI (trade name AURUM; Tg 250° C., manufactured by Mitsui Chemicals, Inc.)

(Outermost Layer)

Polyurethane (trade name TPU F2-NCA, manufactured by Totoku Toryo Co., Ltd.)

PAI-2 (trade name HPC-5000, manufactured by Hitachi Chemical Company, Ltd.)

TPI (trade name AURUM, manufactured by Mitsui Chemicals, Inc.)

Polyamide (trade name Amilan, 66 Nylon, manufactured by Toray Industries, Inc.)

The following evaluations were made on the thus-produced insulated wires in Examples 1 to 13 and Comparative Examples 1 to 5.

[Melting Point and Glass Transition Temperature]

Measurement was made on 10 mg of an insulation layer, under conditions of a heating rate of 5° C./min by using a differential scanning calorimeter "DSC-60" (manufactured by Shimadzu Corporation), and a melting peak temperature in the case of a crystalline resin or a peak temperature of a heat quantity resulting from a glass transition temperature in the case of an amorphous resin, both of which were observed in the temperature range over 180° C., was read, and each was taken as a melting point (Tm) or a glass transition temperature (Tg). In addition, when there exist a plurality of peak temperatures, a higher peak temperature was taken as the melting point.

[Partial Discharge Inception Voltage (PDIV)]

The partial discharge inception voltage of each insulated wire was measured, using a partial discharge tester "KPD2050" (manufactured by Kikusui Electronics Corp). In the case of an insulated wire being square in a cross-sectional shape, a sample was prepared in which faces serving as long sides of two insulated wires were brought into close contact with each other without any space over a length of 150 mm. In the case of a round conductor, a twisted pair by a twistpair method was prepared. An electrode was connected between the two conductors, and an alternating-current voltage having a 50-Hz sine wave was applied therebetween, and while voltage was continuously raised, the voltage (effective value) when an electric discharge amount was 10 pC was measured. A measuring temperature was adjusted to 25° C. at 50% RH. The partial discharge inception voltage was converted, according to the following Dakin's experimental formula, into a partial discharge inception voltage when a thickness of the insulation coating was adjusted to 50 μm, and evaluated.

$$V = 163(t/\varepsilon)^{0.46}$$

In the above-mentioned experimental formula, V represents a partial discharge inception voltage, t represents a thickness (μm) of an insulation layer as a whole, and E represents relative permittivity of the insulation layer as a whole.

A material in which a peak voltage (Vp) of the thus-read voltage was 1,000 or more was judged to be hard to occur the partial discharge under the used conditions, and expressed by "A+"; a material in which the peak voltage was 800 or more and less than 1,000 was judged to be somewhat hard to occur the partial discharge, and expressed by "A"; a material in which the peak voltage was 600 or more and less than 800 was judged to have a possibility of occurring the partial discharge but to be low in a probability thereof, and expressed by "B"; and a material in which the peak voltage was less than 600 was judged to readily occur discharge, and expressed by "C."

[Workability (Adhesion)]

An evaluation was possible to make on workability between the conductor and the coating by the number of turns until floating of the adhesion layer was caused by conducting a test in a manner same with the procedures in 5.1 Winding tests in 5. Flexibility and adhesion in "Winding wires-Test methods", JIS C 3216-3. The evaluation was possible to make on a rectangular wire having a rectangular cross section in a similar manner.

A material in which the number of turns until floating of the adhesion layer was caused was 15 or more was deemed to be good in adhesion, and expressed by "A+"; a material in which the number of turns was 10 or more and less than 15 was deemed to be able to withstand working in the Al conductor, and expressed by "A"; a material in which the number of turns was 5 or more and less than 10 was deemed to be high in a possibility of causing peeling of the coating in working, and expressed by "B"; and a material in which the number of turns was less than 5 or peeling was already caused upon incising the coating in preparation of a sample by a twisting method was expressed by "C."

[Abrasion Resistance]

The abrasion resistance was evaluated on each corner of four corners in the case of a rectangular wire having a rectangular cross section in a manner same with the procedures in 6. Abrasion resistance (applied to enameled round wires) in "Winding wires-Test methods", JIS C 3216-3. Specifically, a test specimen was slid in one direction under a predetermined load until the coating was peeled off under the conditions of 25° C. by using an abrasion tester specified in JIS C 3216-3, and an evaluation was made by reading a scale at which the coating was peeled off, and calculating a product of this scale value and the load used therefor.

A case where the result of the abrasion test in one direction was 2,800 gf or more was deemed to be remarkably excellent in the abrasion resistance, and expressed by "A+"; a case where the result was 2,000 gf or more and less than 2,800 gf was deemed to be preferable, and expressed by "A"; a case where the result was 800 gf or more and less than 2,000 gf and the abrasion resistance was somewhat weak was expressed by "B"; and a case where the result was less than 800 gf was deemed to not satisfy requirements as the winding wire, and expressed by "C."

[Thermal Aging Resistance]

With regard to thermal aging resistance of the insulated wire, a material, which was wound according to 5.1 Windings tests in 5. Flexibility and adhesion in "Winding wires-Test methods", JIS C 3216-3, was placed in a high-temperature chamber set to 190° C. Existence or non-existence of cracks on the coating after the material was allowed to stand for 1,000 hours and 1,500 hours was examined with the naked eye. A case where abnormality, such as cracks, was not confirmable on the coating even after the material was allowed to stand for 1,000 hours was expressed by "A"; and a case where abnormality, such as cracks, was not confirmable on all of the coatings even after the material was allowed to stand for 1,500 hours was expressed by "A+." In addition, a case where abnormality, such as cracks, was confirmable on at least one of the insulation layer and the reinforcement insulation layer after the material was allowed to stand for 1,000 hours was deemed to be passable because the material acted as an insulator, and expressed by "B"; and a case where abnormality, such as cracks, was confirmable on both the insulation layer and the reinforcement insulation layer was deemed to be not passable, and expressed by "C."

When the material was considered as an existing insulator, the thermal aging resistance may be in a level of the evaluation "A" or "B," but when excellent thermal aging resistance is required over a still longer period of time, the thermal aging resistance is preferably in a level of the evaluation "A+."

[Rupture Strength of Conductor]

With regard to measurement of rupture strength of the conductor after the insulated wire was worked, the adhesion layer, the insulation layer, the reinforcement insulation layer, and the outermost layer of the insulated wire were peeled off to expose the conductor, and the measurement was made on this conductor for rupture strength when, with reference to JA.5.2.2 Enameled rectangular wires in JA.5.2 Adhesion in "Winding wires-Test methods", JIS C 3216-3, three specimens each having a length of about 35 cm were taken, a gauge length was adjusted to 250 mm, and each test specimen was elongated at a tensile speed of 300 mm per minute until the test specimen was ruptured. Then, a level of 80 N/mm$^2$ or more was deemed to be a material having particularly satisfactory rupture strength as the winding wire, and expressed by "A+"; a level of 40 N/mm$^2$ or more and less than 80 N/mm$^2$ was deemed to be a material having satisfactory rupture strength as the winding wire, and expressed by "A"; a level of 20 N/mm$^2$ or more and less than 40 N/mm$^2$ was deemed to be a material having sufficient rupture strength as the winding wire, and expressed by "B"; and a level of less than 20 N/mm$^2$ was deemed to be a material having lacked rupture strength, and not passable, as the winding wire, and expressed by "C".

Moreover, a thickness of each layer was measured by observing a cross section after the cross section was polished, by using a microscope "Digital Microscope" (manufactured by KEYENCE Corporation).

When a cross-sectional shape of the conductor was circular, the thickness of each layer in an average of 4 points of a whole circumference was taken as a measured value. Moreover, when the cross-sectional shape was rectangular, an average thickness in the center parts of two short sides in four sides was taken as a thickness of the adhesion layer, a thickness of the insulation layer, a thickness of (the adhesion layer and the insulation layer), a thickness of the reinforcement insulation layer, a thickness of (the adhesion layer, the insulation layer, and the reinforcement insulation layer), and a thickness of the outermost layer, respectively.

The thus-obtained results are summarized and shown in Tables 1 to 3.

In Tables 1 to 3, aluminum conductor is abbreviated to "Al".

TABLE 1

| | | Ex 1 | Ex 2 | Ex 3 | Ex 4 | Ex 5 |
|---|---|---|---|---|---|---|
| | Conductor | Al 99% | Al 99% | Al 99% | Al 98% | Al 98% |
| Adhesion layer | Thickness (μm) | 5 | 10 | 15 | 5 | 3 |
| | Material | PI-1 | PI-1 | PI-1 | PEsI | PEst |
| Insulation layer | Thickness (μm) | 30 | 40 | 20 | 30 | 30 |
| | Material | PI-1/PAI-2 | PI-2 | PAI-2 | PI-1/PAI-2 | PI-1/PAI-2 |
| | Tg or Tm (° C.) | 285 | ≥400 | 280 | 285 | 285 |

TABLE 1-continued

|  |  | Ex 1 | Ex 2 | Ex 3 | Ex 4 | Ex 5 |
|---|---|---|---|---|---|---|
| Thickness of Adhesion layer + Insulation layer (μm) | | 35 | 50 | 35 | 35 | 33 |
| Reinforcement insulation layer | Thickness (μm) | 100 | 130 | 100 | 100 | 100 |
| | Providing method | Forming with thermoplastic resin | Forming with thermoplastic resin | Forming with thermoplastic resin | Forming with thermoplastic resin | Forming with thermoplastic resin |
| | Material | PPS | PEEK | PEEK | PPS | PEEK |
| Thickness of Adhesion layer + Insulation layer + Reinforcement insulation layer (μm) | | 135 | 180 | 135 | 135 | 133 |
| Outermost layer | Material | Reinforcement insulation layer | Reinforcement insulation layer | Polyurethane | Reinforcement insulation layer | PAI-2 |
| | Thickness (μm) | | | 5 | | 10 |
| Evaluation | PDIV | A+ | A | A | A | A |
| | Workability (Adhesion) | A+ | A+ | A+ | A+ | A |
| | Abrasion resistance | A | A | A | A | A |
| | Thermal aging resistance | A+ | A+ | A | A | A |
| | Rupture strength of conductor | A | B | A | A | A |

Note:
"Ex" means Example

TABLE 2

|  |  | Ex 6 | Ex 7 | Ex 8 | Ex 9 | Ex 10 |
|---|---|---|---|---|---|---|
| | Conductor | Al 98% | Al 98% | Al 98% | Al 95% | Al 99% |
| Adhesion layer | Thickness (μm) | 5 | 5 | 5 | 5 | 10 |
| | Material | PAI-1 | PEI | PI-1/PAI-2 | PI-1 | PI-1 |
| Insulation layer | Thickness (μm) | 30 | 30 | 30 | 25 | 30 |
| | Material | PAI-2 | PI-1/PAI-2 | PEsI | PI-1/PAI-2 | PI-1/PAI-2 |
| | Tg or Tm (° C.) | 280 | 285 | 180 | 285 | 285 |
| Thickness of Adhesion layer + Insulation layer (μm) | | 35 | 35 | 35 | 30 | 40 |
| Reinforcement insulation layer | Thickness (μm) | 130 | 50 | 130 | 80 | 80 |
| | Providing method | Winding with insulation tape | Winding with insulation tape | Winding with insulation tape | Forming with thermoplastic resin | Forming with thermoplastic resin |
| | Material | PA paper | PI tape | PA paper | PEEK | PBT |
| Thickness of Adhesion layer + Insulation layer + Reinforcement insulation layer (μm) | | 165 | 85 | 165 | 110 | 120 |
| Outermost layer | Material | TPI | Reinforcement insulation layer | TPI | PA | PA |
| | Thickness (μm) | 10 | | 20 | 20 | 20 |
| Evaluation | PDIV | A | A+ | A+ | A | A |
| | Workability (Adhesion) | A | A | A | B | A |
| | Abrasion resistance | A | B | A | B | B |
| | Thermal aging resistance | A | A | B | B | B |
| | Rupture strength of conductor | A | A | A | A | A |

|  |  | Ex 11 | Ex 12 | Ex 13 |
|---|---|---|---|---|
| | Conductor | Al 99% | Al 95% | Al 99% |
| Adhesion layer | Thickness (μm) | 20 | 5 | 20 |
| | Material | PI-1 | PI-1 | PI-1 |
| Insulation layer | Thickness (μm) | 65 | 50 | 65 |
| | Material | PI-1/PAI-2 | PPS | PI-2 |
| | Tg or Tm (° C.) | 285 | 278 | ≥400 |
| Thickness of Adhesion layer + Insulation layer (μm) | | 85 | 55 | 85 |

TABLE 2-continued

|  |  |  |  |  |
|---|---|---|---|---|
| Reinforcement insulation layer | Thickness (μm) | 60 | 80 | 40 |
|  | Providing method | Forming with thermoplastic resin | Forming with thermoplastic resin | Forming with thermoplastic resin |
|  | Material | PPS | PEEK | TPI |
| Thickness of Adhesion layer + Insulation layer + Reinforcement insulation layer (μm) |  | 145 | 135 | 125 |
| Outermost layer | Material | Reinforcement insulation layer | PA | Reinforcement insulation layer |
|  | Thickness (μm) | — | 20 | — |
| Evaluation | PDIV | A+ | A+ | A+ |
|  | Workability (Adhesion) | B | A | A+ |
|  | Abrasion resistance | B | B | A |
|  | Thermal aging resistance | B | B | A |
|  | Rupture strength of conductor | B | B | B |

TABLE 3

|  |  | C Ex 1 | C Ex 2 | C Ex 3 | C Ex 4 | C Ex 5 |
|---|---|---|---|---|---|---|
|  | Conductor | Cu 99% | Cu 99% | Al 99% | Al 99% | Al 99% |
| Adhesion layer | Thickness (μm) | 5 | 7 | 20 | — | 20 |
|  | Material | PI-1 | PAI-1 | PPS | — | PI-1 |
| Insulation layer | Thickness (μm) | 40 | 30 | 20 | — | 100 |
|  | Material | PI-1/PAI-2 | PI-1/PAI-2 | PI-1/PAI-2 | — | PI-1/PAI-2 |
|  | Tg or Tm (°C.) | 285 | 285 | 285 | — | 285 |
| Thickness of Adhesion layer + Insulation layer (μm) |  | 45 | 37 | 40 | — | 120 |
| Reinforcement insulation layer | Thickness (μm) | 100 | 120 | 100 | 150 | — |
|  | Providing method | Forming with thermoplastic resin | Forming with thermoplastic resin | Forming with thermoplastic resin | Forming with thermoplastic resin | — |
|  | Material | PPS | PEEK | PPS | PEEK | — |
| Thickness of Adhesion layer + Insulation layer + Reinforcement insulation layer (μm) |  | 145 | 157 | 140 | 150 | 120 |
| Outermost layer | Material | Reinforcement insulation layer | Reinforcement insulation layer | Reinforcement insulation layer | Reinforcement insulation layer | Insulation layer |
|  | Thickness (μm) | — | — | — | — | — |
| Evaluation | PDIV | A | A | A+ | A+ | C |
|  | Workability (Adhesion) | B | B | C | C | C |
|  | Abrasion resistance | B | B | B | C | A |
|  | Thermal aging resistance | C | C | C | C | C |
|  | Rupture strength of conductor | A+ | A+ | A | A+ | C |

Note:
"C Ex" means Comparative Example

As is apparent from the results in Tables 1 to 3 described above, the insulated wires in Examples 1 to 13, in which each has, on the aluminum conductor, the adhesion layer formed by applying the varnish containing the carboxy group and baking the resultant material, the insulation layer as the outer layer of the adhesion layer, and further the reinforcement insulation layer as the outer layer of the insulation layer, were found to be generally excellent in the adhesion between the conductor and the coating layer, the abrasion resistance, and the thermal aging resistance, and further excellent in suppressing lowering in the rupture strength of the conductor, and in which also each has the high partial discharge inception voltage.

Contrary to the above, in Comparative Examples 1 and 2 in which the conductors made of copper were used, the thermal aging resistance was insufficient. Moreover, in Comparative Example 3 in which the adhesion layer was formed by extrusion covering, the adhesion between the conductor and the coating layer was poor, and the thermal aging resistance was also insufficient. In Comparative Example 4 in which only the reinforcement insulation layer was formed on the conductor by extrusion covering, all of the adhesion, the abrasion resistance, and the thermal aging resistance were insufficient. In Comparative Example 5 in which the insulated wire had no reinforcement insulation layer, all of the partial discharge inception voltage, the adhesion, the thermal aging resistance, and the rupture strength of the conductor were insufficient.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Conductor
2 Adhesion layer
3 Insulation layer
4 Reinforcement insulation layer
5 Outermost layer
6 Insulated wire (electric wire)
7 Covering layer
8 Flat face
9 Edge face
10 Slot

The invention claimed is:

1. An insulated wire which comprises an aluminum conductor, having:
   an adhesion layer baked on the aluminum conductor;
   an insulation layer as an outer layer of the adhesion layer; and
   a reinforcement insulation layer as an outer layer of the insulation layer;
   wherein the adhesion layer comprises a varnish containing a carboxy group.

2. The insulated wire according to claim 1, wherein a total thickness of the adhesion layer and the insulation layer is 20 µm or more and 85 µm or less.

3. The insulated wire according to claim 1, wherein a resin with which the insulation layer is formed is a crystalline resin having a melting point of 180° C. or higher or an amorphous resin having a glass transition temperature of 180° C. or higher.

4. The insulated wire according to claim 1, wherein the varnish contains polyamic acid.

5. The insulated wire according to claim 1, wherein the reinforcement insulation layer is composed of a thermoplastic resin.

6. The insulated wire according to claim 1, wherein purity of aluminum in the aluminum conductor is 95% or more.

7. The insulated wire according to claim 1, wherein a resin with which the insulation layer is composed is composed of a thermosetting resin having a glass transition temperature of 180° C. or higher, and wherein a resin over 50 mass % of the resin with which the insulation layer is composed is polyamideimide or/and polyimide.

8. The insulated wire according to claim 1, wherein a resin with which the insulation layer is composed is composed of a thermosetting resin having a glass transition temperature of 180° C. or higher, and wherein a resin over 50 mass % of the resin with which the insulation layer is composed is a mixed resin of polyamideimide and polyimide.

9. The insulated wire according to claim 1, wherein the reinforcement insulation layer is composed of a thermoplastic resin containing at least one selected from polyether ether ketone, thermoplastic polyimide, and polyphenylene sulfide, and is formed by performing extrusion of the thermoplastic resin.

10. The insulated wire according to claim 1, wherein a cross-sectional shape of the aluminum conductor is rectangular.

* * * * *